United States Patent
Fariss et al.

(10) Patent No.: US 11,720,375 B2
(45) Date of Patent: Aug. 8, 2023

(54) SYSTEM AND METHOD FOR INTELLIGENTLY IDENTIFYING AND DYNAMICALLY PRESENTING INCIDENT AND UNIT INFORMATION TO A PUBLIC SAFETY USER BASED ON HISTORICAL USER INTERFACE INTERACTIONS

(71) Applicant: MOTOROLA SOLUTIONS, INC., Chicago, IL (US)

(72) Inventors: Ahmad A Fariss, Glendale Heights, IL (US); Shaik Shavali Shaik, New Berlin, WI (US); Nurie Solemani, Wheaton, IL (US); Yunchen Huang, Plainfield, IL (US); Isabel Firpo, Chicago, IL (US); Deeptha Setlur, Naperville, IL (US); Min Ma, Lake Zurich, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 341 days.

(21) Appl. No.: 16/714,874

(22) Filed: Dec. 16, 2019

(65) Prior Publication Data
US 2021/0182084 A1    Jun. 17, 2021

(51) Int. Cl.
*G06F 3/048*    (2013.01)
*G06F 9/451*    (2018.01)
(Continued)

(52) U.S. Cl.
CPC ............. *G06F 9/451* (2018.02); *G06N 20/00* (2019.01); *G06Q 50/265* (2013.01)

(58) Field of Classification Search
CPC ......... H04W 76/50; H04W 4/21; H04W 4/14; H04W 4/021; H04W 4/20; H04W 4/50; H04W 76/20
See application file for complete search history.

(56) References Cited

U.S. PATENT DOCUMENTS 9,015,594 B2    4/2015 Dailey
2003/0046401 A1    3/2003 Abbott et al.
(Continued)

FOREIGN PATENT DOCUMENTS

CN    108363602 A    8/2018

OTHER PUBLICATIONS

The International Search Report and the Written Opinion corresponding patent application No. PCT/US2020/061734 filed Nov. 23, 2020 dated Mar. 22, 2021, all pages.

*Primary Examiner* — Linh K Pham

(57) ABSTRACT

Techniques for generating a user interface (UI) for a public safety user are provided. An event trigger may be received at a computing device associated with a public safety user. The event trigger may be associated with a public safety event. Historical interaction with at least one UI object by the public safety user when handling previous event triggers of the same type as the received event trigger may be determined. The historical interaction may be retrieved from a historical UI interaction data store. UI objects that the public safety user may interact with to handle the received event trigger may be identified based on the determined historical interaction. A UI may be generated to handle the received event trigger, the UI to handle the received event trigger including the identified UI objects.

20 Claims, 4 Drawing Sheets

(51) Int. Cl.
*G06N 20/00* (2019.01)
*G06Q 50/26* (2012.01)

(56) References Cited

U.S. PATENT DOCUMENTS

| | | |
|---|---|---|
| 2007/0300185 A1 | 12/2007 | MacBeth et al. |
| 2010/0057646 A1 | 3/2010 | Martin et al. |
| 2013/0152001 A1 | 6/2013 | Lovitt et al. |
| 2014/0359499 A1 | 12/2014 | Powell |
| 2015/0120633 A1* | 4/2015 | Norlander .............. G16H 20/30 |
| | | 706/46 |
| 2016/0077728 A1 | 9/2016 | Padgett et al. |
| 2016/0291807 A1 | 10/2016 | Chong et al. |
| 2017/0322679 A1 | 11/2017 | Gordon |
| 2018/0365025 A1 | 12/2018 | Almecija et al. |
| 2019/0378397 A1* | 12/2019 | Williams, II .......... G06N 5/043 |

* cited by examiner

SYSTEM AND METHOD FOR INTELLIGENTLY IDENTIFYING AND DYNAMICALLY PRESENTING INCIDENT AND UNIT INFORMATION TO A PUBLIC SAFETY USER BASED ON HISTORICAL USER INTERFACE INTERACTIONS

BACKGROUND

Emergency call handlers (e.g. 911 call takers/dispatchers) may have an enormous amount of information at their fingertips. For example, a dispatcher may have access to emergency call taking systems where they may retrieve details about incoming calls (e.g. location information, caller identification information, reported incident type information, etc.). The dispatcher may also have access to computer aided dispatch (CAD) systems that may be utilized to determine which responder units (e.g. police officers, fire personnel, medical personnel, etc.) are available and have the correct skills to respond to an incident. The CAD systems may be used to assign responders to an incident.

Dispatchers may also have access to radio communications systems (e.g. radio console, etc.) which may be used to instruct responders to respond to reported incidents. The radio communications systems may also be used to create communications groups amongst multiple responders that are responding to the same incident. Dispatchers may have access to situation awareness systems through which access to information about the location an incident is occurring may be available. For example, in a city, all accessible security cameras may provide their video feeds to a situational awareness system. A dispatcher may then have access to those feeds via a situational awareness system. A dispatcher may utilize information from all these systems when formulating a response to a reported incident.

Dispatchers may also have access to records and evidence (R&E) systems. These systems may contain records and evidence that may be related to an incident that is ongoing and is currently being reported (e.g. history of criminal activity, domestic violence, known offenders, etc.). What should be understood is that dispatchers now have access to more information than ever before.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
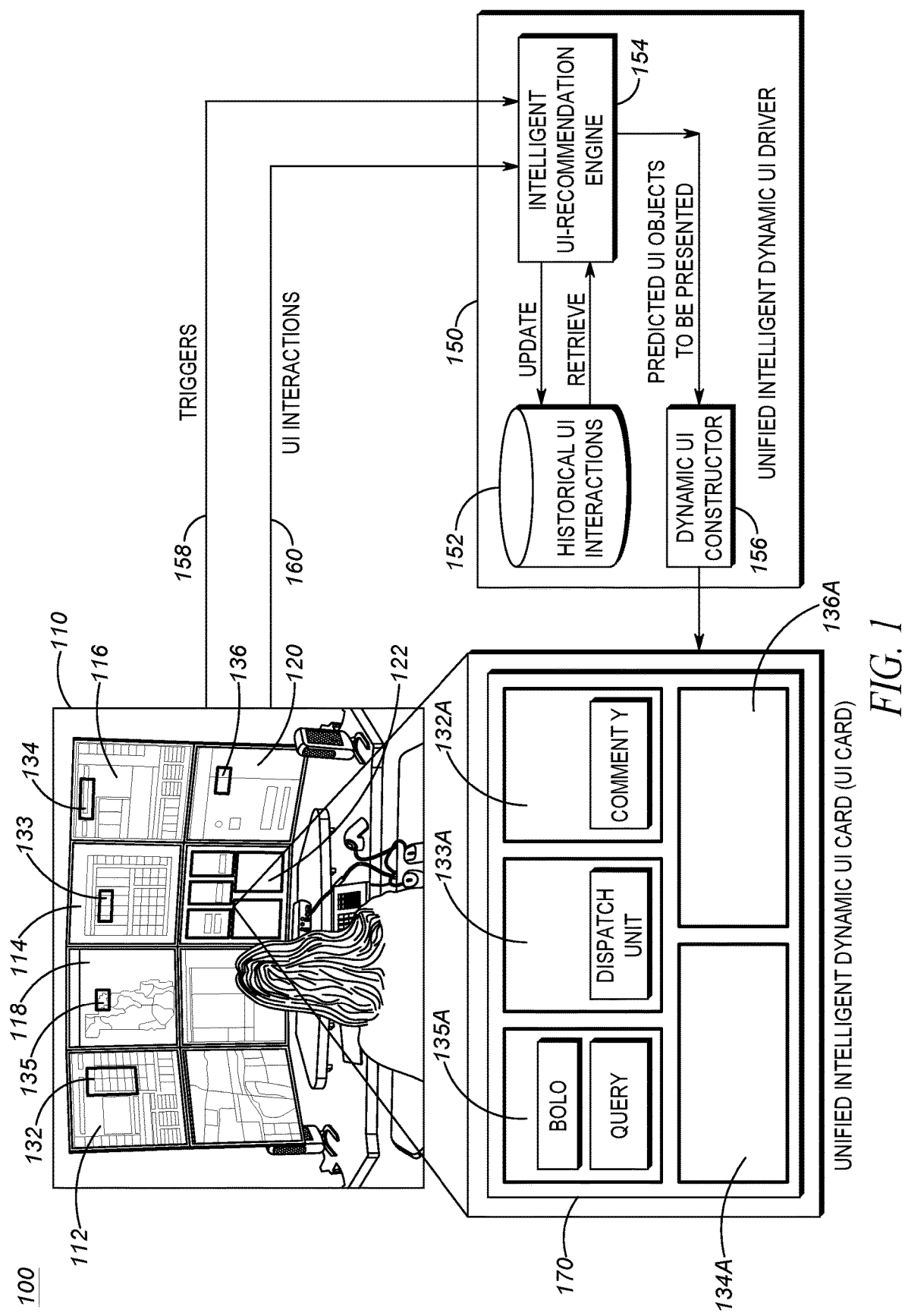
FIG. 1 is a block diagram of an example system that may implement the intelligently identifying and dynamically presenting incident and unit information to a public safety user based on historical user interface interactions techniques described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Although dispatchers may have access to more information than ever before, a problem arises in that there may be too much information available. For example, each of the systems described above may include vast amounts of data that may or may not be relevant to handling an incident that is currently in progress. Making the situation worse is that often times each of the systems described above (e.g. call taking, CAD, radio console, situation awareness, R&E, etc.) are provided by a different vendor.

Each vendor may utilize their own user interface (UI) which could include static and dynamic user interface objects. Because the systems may be provided by different vendors, the user UIs for those systems may be displayed on different monitors. The end result being that a dispatcher station includes multiple monitors, keyboards, mice, etc. (e.g. each system may require its own input/output devices). As a result, the dispatcher may not only be overwhelmed with information, but they are also left with having to navigate multiple UIs that may use separate input/output devices.

The techniques described herein overcome these problems and others, individually and collectively. A system is provided that may receive an event trigger (e.g. call to 911, change in context of an incident that is being handled, etc.). The system may then look to historical user activity to determine what actions the user had taken when handling similar triggers related to previous incidents. For example, the system may determine which UI objects the user interacted with when handling historical incidents.

The system may then create a single card via a card based UI. This card may include UI objects that were used/accessed when handling previous historical triggers. It should be understood that these UI objects do not necessarily come from the same system (with each system potentially being provided by a different vendor). As a result, the user is provided a single UI through which access to the different systems may be provided. The user need not deal with accessing each system independently.

Although the system does provide a single card based UI interface through which the most likely UI objects (e.g. based on historical data, etc.) may be interacted with, the user is not prohibited from accessing UI objects through the UI provided by the individual systems. In fact, when the user does access UI objects directly through the individual systems, the techniques described herein utilize that information to update the historical UI object interaction information and learn from the interaction (e.g. online machine learning, etc.). Upon the next trigger for a similar incident, the historical information may cause the UI object that was previously accessed through the UI of the individual system to be placed on the card based UI.

The system may use historical actions of an individual user to customize what is presented based on that particular user's previous UI object interactions. Thus, the system can learn how the user prefers to work. In addition, the system may also learn over the aggregated behavior of all users, such that the UI objects presented to an individual user is based on the UI object interactions of the overall user base (e.g. the UI objects most frequently access by all users, etc.).

As the incident evolves, additional triggers may be received. For example, responding units have arrived on scene, incident status has escalated, responder requesting assistance, shots fired, etc., may all be new triggers that may be received for an ongoing incident. The system may receive these triggers and may update the single card based UI to include the UI objects that would most likely be needed by a dispatcher given historical interaction with UI objects when the trigger is received.

A method for generating a user interface (UI) for a public safety user is provided. An event trigger may be received at a computing device associated with the public safety user. The event trigger associated with a public safety event. Historical UI interaction with at least one UI object by the public safety user when handling previous event triggers of the same type as the received event trigger may be determined. The historical UI interaction may be retrieved from a historical UI interaction data store. UI objects that the public safety user may interact with to handle the received event trigger based on the determined historical interaction may be identified. A UI to handle the received event trigger including the identified UI objects may be generated.

In one aspect, the method may further comprise monitoring interaction of the public safety user with the identified UI objects on the generated UI, monitoring interaction of the public safety user with UI objects that were not on the generated UI, and updating the historical UI interaction data store based on the monitoring. In one aspect, updating the historical UI interaction data store may further comprise updating the historical UI interaction data store utilizing online machine learning.

In one aspect, at least one UI object may be an actionable object. In one aspect, the user interface may be a card based user interface. In one aspect, the historical UI interaction data store may include historical UI interaction of a plurality of public safety users. In one aspect, the identified UI objects may come from at least two different public safety applications.

A system for generating a user interface (UI) for a public safety user is provided. The system may include a processor and a memory coupled to the processor. The memory may contain thereon a set of instructions that when executed by the processor cause the processor to receive, at a computing device associated with the public safety user, an event trigger, the event trigger associated with a public safety event. The instructions may further cause the processor to determine historical UI interaction with at least one UI object by the public safety user when handling previous event triggers of the same type as the received event trigger, the historical UI interaction retrieved from a historical UI interaction data store. The instructions may further cause the processor to identify UI objects that the public safety user may interact with to handle the received event trigger based on the determined historical interaction. The instructions may further cause the processor to generate a UI to handle the received event trigger, the UI to handle the received event trigger including the identified UI objects.

In one aspect, the instructions may further cause the processor to monitor interaction of the public safety user with the identified UI objects on the generated UI, monitor interaction of the public safety user with UI objects that were not on the generated UI, and update the historical UI interaction data store based on the monitoring. In one aspect, the instructions to update the historical UI interaction data store may further comprise instructions to update the historical UI interaction data store utilizing online machine learning. In one aspect, at least one UI object may be an actionable object. In one aspect, the user interface may be a card based user interface. In one aspect, the historical UI interaction data store may include historical UI interaction of a plurality of public safety users. In one aspect, the identified UI objects may come from at least two different public safety applications.

A non-transitory processor readable medium containing a set of instructions thereon is provided. When executed by a processor the instructions may cause the processor to receive, at a computing device associated with the public safety user, an event trigger, the event trigger associated with a public safety event. The instructions may further cause the processor to determine historical UI interaction with at least one UI object by the public safety user when handling previous event triggers of the same type as the received event trigger, the historical UI interaction retrieved from a historical UI interaction data store. The instructions may further cause the processor to identify UI objects that the public safety user may interact with to handle the received event trigger based on the determined historical interaction. The instructions may further cause the processor to generate a UI to handle the received event trigger, the UI to handle the received event trigger including the identified UI objects.

In one aspect, the instructions on the medium may further cause the processor to monitor interaction of the public safety user with the identified UI objects on the generated UI, monitor interaction of the public safety user with UI objects that were not on the generated UI, and update the historical UI interaction data store based on the monitoring. In one aspect, the instructions on the medium to update the historical UI interaction data store may further comprise instructions to update the historical UI interaction data store utilizing online machine learning. In one aspect, at least one UI object may be an actionable object. In one aspect, the user interface may be a card based user interface. In one aspect, the identified UI objects may come from at least two different public safety applications.

FIG. 1 is a block diagram of an example system that may implement the intelligently identifying and dynamically presenting incident and unit information to a public safety user based on historical user interface interactions techniques described herein. System 100 includes an example of a public safety dispatcher's workstation (i.e. dispatch position) 110 and a unified intelligent dynamic UI driver 150.

In some implementations, a dispatcher may act as a call taker. Dispatch position 110 may include facilities for enabling communications between callers to the Public Safety Answering Point (PSAP) and call takers. For example, the dispatch position may be coupled with the public switched telephone network (PSTN) to receive calls from the traditional phone network. The dispatch positon may be coupled to an internet protocol (IP) based communication system through which voice over IP (VoIP) calls may be received. The dispatch position may be coupled with regional public safety systems which utilize IP routing to route callers to a PSAP that is located in the same region as the caller. The dispatch position may also be coupled to networks that allow for the receipt of text based messages (e.g. Instant Messages (IM), email messages, etc.). The dispatch position may also be coupled to social media systems (e.g. Facebook, Twitter, Instagram, etc.) that allows for receipt of messages through social media channels.

In other implementations, the dispatcher and call taker roles may be separate. A call taker may have access to the communications facilities described above and may utilize an Electronic Call Handling (ECH) system to gather details from people calling the PSAP. For example, the call taker may obtain initial incident information (e.g. type of incident, location, etc.) from a caller and enter that information into an ECH system. The information for the ECH system may be accessible to the dispatch position 110. For example, monitor 112 may display all information available from the ECH system. The dispatcher may utilize ECH system 112 to access information provided by the caller.

The dispatch position 110 may also include a computer aided dispatch (CAD) system 114. The CAD system may be utilized to keep track of which responders are currently assigned to incidents and which ones are available. The CAD system may also be utilized to provide recommendations as to which responders should be assigned to an incident (e.g. have incident specific skills, are in closest proximity to incident, workload balancing factors, etc.). The CAD system may keep track of equipment associated with individual responders/groups of responders. For example, if a police officer is equipped with a Taser (e.g. less than lethal device) or if a fire response squad is equipped with extraction equipment to handle responding to a car accident. What should be understood is that the CAD system may be utilized to assign responders to incidents.

The dispatch position 110 may also include a radio console system 116. Through the radio console system, the dispatcher may communicate with responders using both voice and data. Most responders will be equipped with Land Mobile Radio (LMR) communications devices. For example, responders will typically have a mobile LMR device in their vehicle and may also carry a portable LMR walkie-talkie device for use when outside of their vehicle. In other cases, responders may communicate via other types of devices, such as smartphones that utilize the cellular telephone network.

In addition to allowing voice communication with responders, the radio console system 116 may also allow the dispatcher to send data to the responder. For example, police officers may have mobile data terminals in their patrol vehicles. The radio console system may be utilized to send data (e.g. text, images, etc.) from the dispatcher to the responder. The radio console system may also provide the ability to allow for dispatchers to "patch" groups of responders that are working together on an incident into a talk group, such that all members of a talk group may hear all communications from the talk group members. What should be understood is the radio console system may allow for the dispatcher to communicate with responders in the field.

The dispatch position 110 may also include a situational awareness system 118. The presence of security cameras accessible to public safety personnel is ever increasing. In some cases, public safety agencies may install their own security cameras in publically accessible areas. In some cases, other government agencies (e.g. department of transportation, etc.) may install their own cameras (e.g. for traffic management, etc.). These other agencies may grant public safety access to the image feeds from those cameras. In some cases, private individuals may install security cameras and register those cameras with public safety agencies and grant those agencies access to the video feed of those security cameras. For example, an owner of a convenience store may install a security camera system and then allow public safety personnel live access to those camera feeds.

Regardless of the source of the information, the camera feeds may be displayed via the situational awareness system 118. The system may provide a UI that allows the dispatcher to navigate to a particular camera of interest for a given incident. The situation awareness system may also include other information that is not video related. For example, gunshot detection systems may be utilized to detect gunshots and based on various forms of triangulation, determine the source location of those gunshots. The situational awareness system may provide indication of where a gunshot was detected. What should be understood is that the situational awareness system may provide the dispatcher with information related to the incident scene that may be obtained from sources other than the caller or the responders.

The dispatch position 110 may also include a Records and Evidence (R&E) system 120. The R&E system may incudes data that includes records related to previous incidents. For example, if an incident location has had multiple calls for service due to repeated criminal activity. Records could also include information about the location such as known hazards (e.g. vicious dog, etc.). The records could include information about items previously seized at the incident location (e.g. guns, drugs, etc.). What should be understood is that the R&E system may provide the dispatcher with information about the incident location that was based on previous incidents at the location.

Although several examples of systems accessible to dispatchers have been provided, it should be understood that these are only examples. The techniques described herein may be utilized with these types of systems as well as other systems that have yet to be developed. As will be explained in further detail below, the techniques described herein provide the ability to aggregate the most likely to be used UI objects (based on historical data) from any system and present those UI objects on a single unified card based interface.

Figure 4:
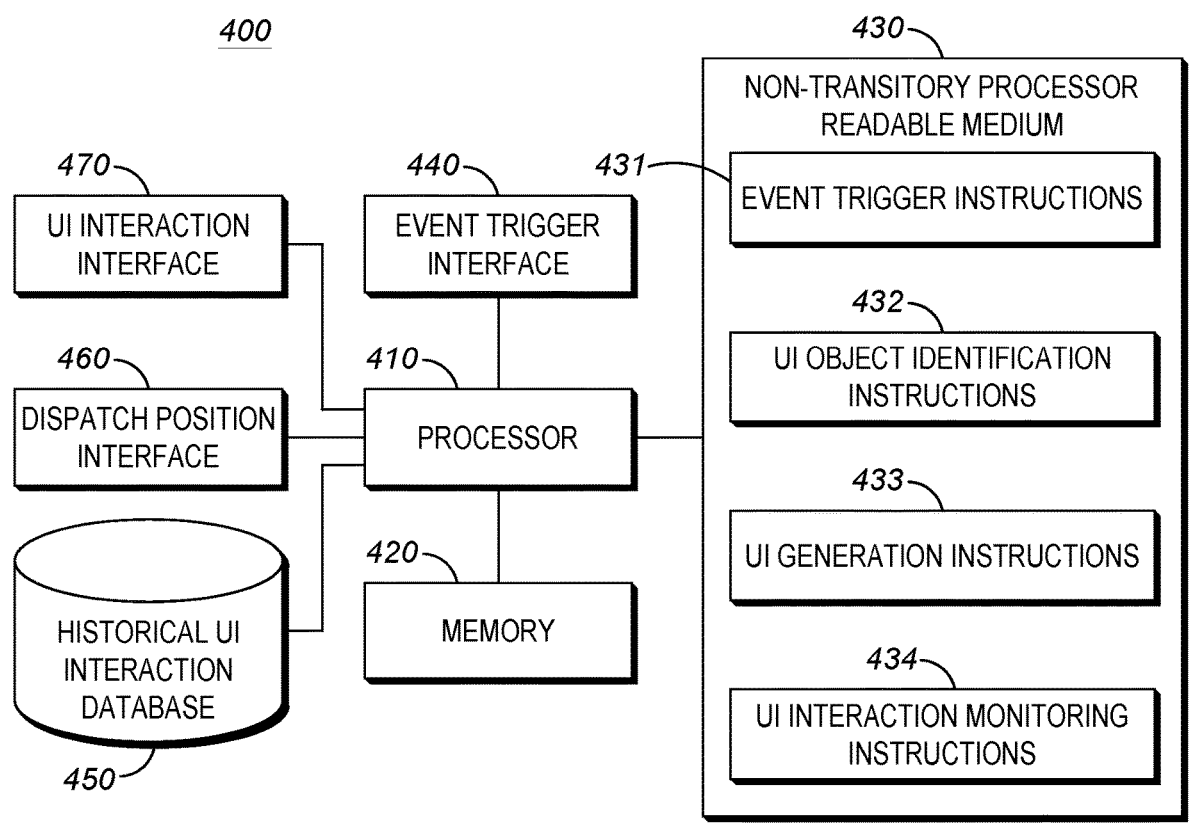
FIG. 4 is an example of a device that may implement the techniques described herein.

System 100 may also include Unified intelligent dynamic UI driver 150 which will herein be referred to as the UID. The UID may include historical UI interactions database 152, Intelligent UI Recommendation Engine 154, and dynamic UI constructor 156. UID may be a standalone system or may be integrated with one or more existing systems. FIG. 4 depicts an example device that may implement the functionality of the UID. However, it should be understood that the techniques described herein are not dependent on any particular implementation of the UID.

Historical UI interactions database 152 may store the interactions a user has with UI objects when responding to triggers. Triggers, and their use in the system described herein, will be described in further detail below. What should be understood is that the UI interactions database stores the historical interactions that the user has with UI objects that are presented. The UI interactions stored are not limited to those that occur through the Unified Intelligent Dynamic UI Card 170. UI interactions performed directly on the assorted systems (e.g. ECH 112, CAD 114, radio console 116, situational awareness 118, R&E 120, etc.) are also stored in the UI interactions database.

User interactions with UI objects can be determined in many different ways, depending on the type of UI object. For example, some UI objects are directly actionable, meaning that the user actively interacts with the UI object. Some examples of directly actionable UI objects may include clickable buttons, drop down menus, fields where text can be entered, etc. In other words, directly actionable UI objects are those that the user may interact with via input devices (e.g. mouse, keyboard, etc.).

Other UI objects may be passive. For example, a static text field, a map, a status summary, etc., may be UI objects that provide information, but that the user does not necessarily interact with via an input device. Detecting interaction with such objects may include techniques such as eye gaze detection, to determine which UI object the user is looking at. The techniques could also include detecting mouse hover interactions, which may indicate a user is examining a UI object.

Other forms of UI object interaction could include minimizing/maximizing UI objects, moving UI objects to the foreground/background, opening/closing UI objects, etc. These actions may be used to determine which UI objects the user is finding useful when responding to triggers and which ones are less useful. These historical UI interactions may be stored in the historical UI interactions database 152 for use in generating UI Cards 170.

The UID 150 may also include Intelligent UI Recommendation Engine (IRE) 154. The IRE may receive event triggers 158 (described in further detail below) and access the historical UI interactions database 152 to retrieve the user's historical UI object interactions when handling similar (or the same) triggers. The IRE may predict which UI objects the user may interact with based on the historical interactions. The IRE may then pass those predictions to a dynamic UI constructor 156 for generation of a UI Card 170. The process of generating a UI card is described in further detail below.

In addition to receiving triggers, the IRE 154 may also receive user UI interactions 160. UI interactions 160 are the actual UI object interactions that the user has with the dispatch position 110. These may include interactions with the UI object presented by the various systems directly (e.g. ECH 112, CAD 114, radio console 116, situational awareness 118, R&E 120, etc.) or they may be UI object interactions the user has with the UI Card 170. What should be understood is that UI Interactions 160 are the UI objects that the user actually interacted with during the handling of the current incident.

The IRE 154 may then update the historical UI interactions database 152 with the actual user UI interactions when handling the trigger. This information may be utilized by the IRE the next time the same trigger is received, thus allowing the IRE to learn which UI objects are used by the user and which ones are not.

The dynamic UI constructor 156 may take the predicted UI objects from the IRE 154 and create a dynamic UI Card 170 that includes the predicted UI objects on a single card based user interface. The UI card 170 may be displayed on one of the monitors 122 of the dispatch position 110. The UI card may contain the UI objects that the IRE predicted the user would interact with. As has been mentioned previously, the user is not prohibited from interacting with UI objects provided by the other systems within the dispatch position. In fact, interactions with UI objects not on the UI card are monitored and the next time a similar event trigger is received, the IRE may include those UI objects on the UI card.

In operation, the UID 154 may receive a trigger. A trigger is, in effect, any type of indication that there has been a public safety context change with respect to the dispatch position 110. For example, one of the easiest triggers to understand may be that a new incident has been reported to the PSAP. A call taker may have received a call and entered the information received from the caller into the ECH 112 system. The new incident may be considered a trigger for the IRE.

Another type of trigger may be an incident type trigger. In some cases, an incident may initially be of one type but later evolves into a different type. For example, an incident may initially be reported as two people arguing loudly (i.e. disturbing the peace). However, upon arrival of a police officer, those two people may now be engaged in a physical fight (e.g. assault). The change in incident type may trigger changes to the UI card, as will be explained in further detail below.

Yet another type of trigger may be a change in the incident context. For example, an incident may initially be reported as shots fired, with minimal context related information. At a later point, the context of the incident may be updated to indicate that the incident is occurring in a school or a crowded shopping mall. The context of the incident may have an impact on the UI objects that the user would need to interact with.

Yet another type of trigger may be unit (e.g. responder) status. For example, unit status may include whether a particular responder has been assigned to an incident or not. The UI objects that may be interacted with when a unit has been assigned to an incident may be different than those of a unit that has not yet been assigned. For example, once a unit has been assigned to an incident, it may make sense to include a "gun drawn" UI object on the UI Card, while it would not be as useful to display such a UI object for an officer that has not yet been assigned to the incident.

Yet another trigger may be a unit trigger which may indicate changes to a responding unit. For example, a responding unit may generate a trigger when it transitions from "enroute" to "arrived on scene." Likewise, a unit trigger may be generated when a responder leaves an incident scene. Yet another form of unit trigger may be a unit context trigger. For example, a responder may initially arrive at an incident scene and may be calmly assessing the situation. A suspect at the incident scene may decide to run away, causing the officer to give foot chase. Thus, the context of the responding unit has changed from investigation to foot pursuit. The dispatcher may interact with different UI objects based on the context.

What should be understood is that a trigger is any change, including changes to status or context, of responding units or the incident itself that may alter which UI objects the user would most likely interact with. It should be further understood that triggers may interact with incident types and unit status. For example, the same trigger may cause different UI objects to be presented based on the given incident type or unit status. The particular action taken for a trigger may be determined based on the combination of incident type, unit status, and triggering event. As any given incident evolves, the UI objects that the user interacts with changes based on the particular trigger received as well as incident type, unit status, etc. The UI objects that are presented are based on those triggers.

Continuing with the example, assume that a trigger 158 is received indicating a new incident has been reported. Assume that the incident is a burglary in progress. The IRE 154 may receive the trigger and access the historical UI interactions database 152 to retrieve which UI objects are typically interacted with by the user when processing a burglary in progress trigger. In the present example, assume that historically, the user interacted with a portion of the ECH system 112 by viewing a data field that included the address of the incident as well as interacted with an actionable button that allowed the user to enter a comment into the ECH system. For ease of description, these portions are represented by box 132 in FIG. 1. The IRE may then predict that the user will interact with the UI objects 132.

Likewise, assume that the user will interact with the CAD system 114 by interacting with an available unit UI object as well as a dispatch UI object. These objects are represented by box 133. The IRE may then predict that the user will interact with the UI objects 133 by viewing the available units and clicking a button to dispatch an available unit, based on historical UI interactions from the historical UI interactions database 152.

Similarly, the IRE may predict interactions with UI objects 134 from the radio console system 116, UI objects 135 from the situational awareness system 118, and UI objects 136 from the R&E system. It should be noted that UI objects 132-136 may simply be a subset of the UI objects available on each of their respective systems. What should be understood is that these particular UI objects may have been interacted with on a previous trigger of the same type. It should also be understood that the UI objects may have been interacted with either on the UI card (as explained below) or on the individual systems themselves.

The IRE 154 may then send the UI object interaction predictions to the dynamic UI constructor 156. The dynamic UI constructor may then generate a UI card 170 that includes all of the predicted UI objects that the user will interact with. For example, UI objects 132-136 in the individual systems may be placed on UI Card 170 as UI objects 132A, 133A, 134A, 135A, and 136A, respectively. The UI Card may be presented to the user on monitor 122. As should be clear, the UI card interface provides a single UI for the user to interact with all the UI objects that have historically been interacted with for this particular trigger.

As mentioned above, the various systems (applications) may be provided by different vendors. Thus, the UI card 170 may include UI objects from multiple different applications. By aggregating all of those UI objects from different applications into a single UI Card 170, the user no longer needs to access each system individually. All interactions with the UI objects can occur through the single UI card.

When the user interacts with the UI objects on the UI card, this may generate additional triggers. For example, as shown, the user may view and address and enter a comment into the ECH system via UI object 132A. When the user activates the actionable comment UI object, this may generate a new trigger. The trigger may then be processed by the IRE 154 to determine, based on the user history, if new and/or different UI objects should be presented on the UI card.

As another example, when the user interacts with the UI object 133A associated with the CAD system 114 to dispatch a unit, this may generate a unit dispatched trigger. The IRE 154 may receive this trigger and determine that the dispatch unit UI object is historically not used after a unit is dispatched, but rather a UI object that tracks the unit is used. The IRE may send this prediction to the dynamic UI constructor, which may then replace the dispatch unit UI object with a unit tracking UI object. What should be understood is that as additional actions are taken or status or context is updated, additional triggers may be created. These additional triggers may cause the IRE 154 to determine the historical UI object interactions for those triggers and update the UI card 170 via the dynamic UI constructor 156.

The IRE 154 may also receive user UI interactions 160 from the dispatch position 110. The UI interactions may be the actual interactions the user has with UI objects in the dispatch position. Note, these interactions may include interactions with the UI card 170 on monitor 122, as well as interactions with all other systems (e.g. ECH 112, CAD 114, radio console 116, situational awareness 118, R&E 120, etc.). If the user interacts with UI objects that are not on the UI card, the IRE may update the historical UI interactions database 152 to indicate the interaction. Thus, upon the next occurrence of the same event trigger, the UI object that was interacted with may be predicted to be interacted with again and may be placed on the UI Card.

In addition to monitoring which UI objects are interacted with, the IRE 154 may monitor UI objects that are not interacted with and update the historical UI interactions database 152. UI objects that are not interacted with may not be necessary for processing the incident, and as such may be omitted from the UI Card.

In some implementations, when a user has little or no historical activity in the historical UI interaction database 152, the IRE 154 may initially predict no UI objects will be interacted with or may select a random set of UI objects and present these selections on the UI card 170. The IRE may then observe the UI interactions 160 (as well as the lack of UI interactions) to determine which UI objects are useful to present on the UI card and which ones are not useful. The end result may be that the IRE effectively trains itself based on the UI object interactions of the user.

It should be understood that the previous self-training of the IRE 154 may take a period of time before converging on an acceptable rate of correct UI object interaction prediction. In some implementations, in order to speed up the process, the historical UI interactions database 152 may include historical UI object interactions of all users. Initially, the historical UI interactions of the broader set of user may be utilized while a historical record of a specific user is developed. The end result being that the IRE may converge on an acceptable rate of correct UI object interaction prediction quicker than by relying on only the user's UI object interaction. Furthermore, in other implementation, where two dispatchers are known to have similar UI interactions, the historical UI object interactions can be copied from the user that has more UI object interactions history to the user that has less or no UI object interactions history in order to expedite the self-training process of the IRE 154.

It should further be noted that the IRE 154 continuously learns and adapts to the user. For example, consider the case of a rookie dispatcher who is not that familiar with the geography of the area that is being covered. Such a user may initially utilize the map UI object of situational awareness system 118. As such, the IRE would likely include a predicted use of the map UI object which would cause the map UI object to appear on the UI card. As the rookie dispatcher becomes more experienced with the local geography, they may no longer interact with the map UI object. The IRE 154 may note this lack of interaction and may subsequently not predict interaction with the map UI object for subsequent triggers. As such, the map UI object may no longer appear on the UI card 170.

Figure 2:
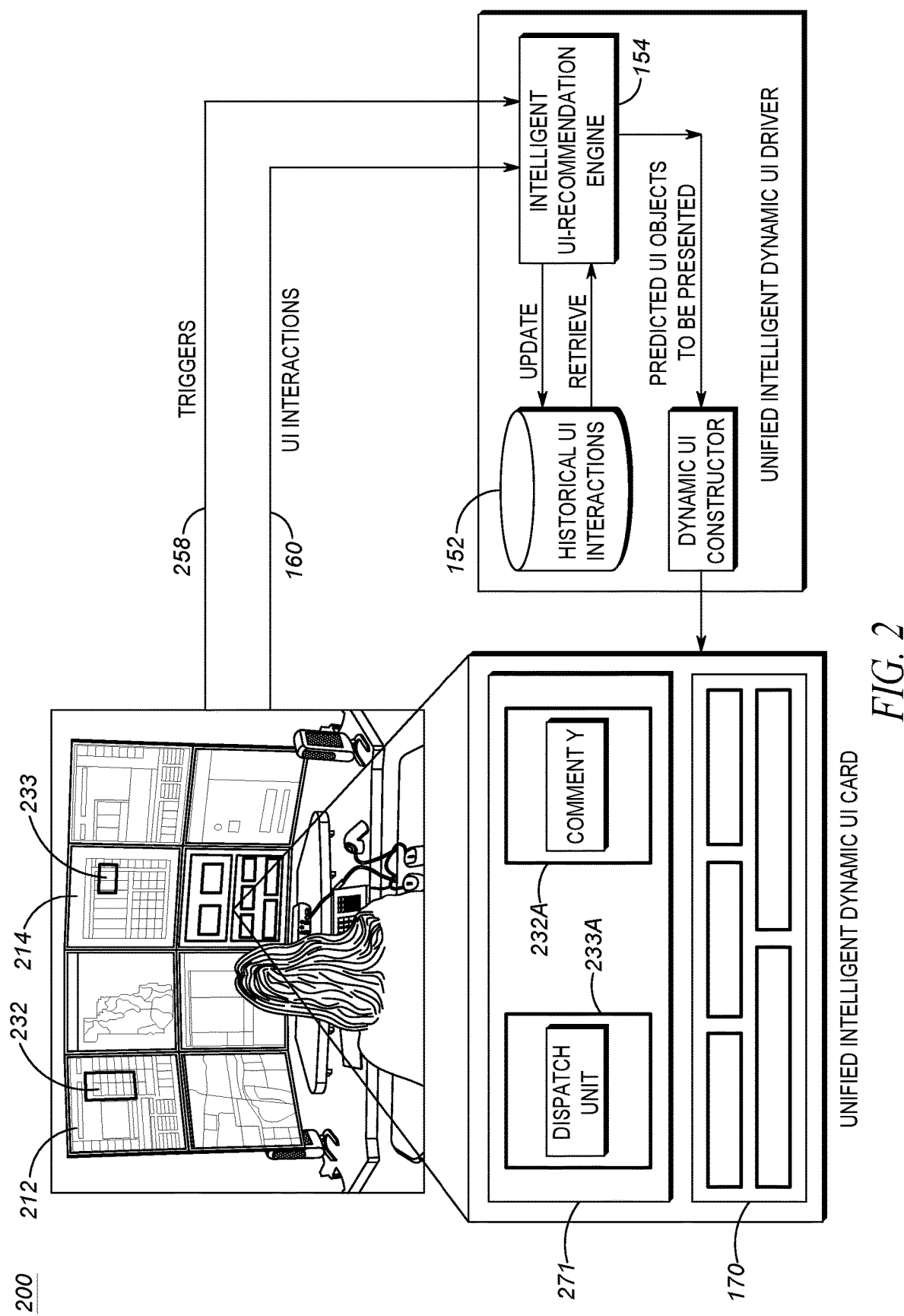
FIG. 2 is an example of a block diagram of a system implementing the techniques described herein when an additional trigger for a different incident is received.

FIG. 2 is an example of a block diagram of a system 200 implementing the techniques described herein when an additional trigger for a different incident is received. The triggers described with respect to FIG. 1 were all related to a single incident. In most PSAPs, dispatchers are handling multiple incidents at any given time. An incident trigger 258 may be received for a new incident. Just as above, the IRE 154 may generate UI object interaction predictions based on the historical UI interactions database 152. These predictions may be passed to dynamic UI constructor 156 which may use the predictions to generate UI card 271.

As shown, UI card depicts a predicted interaction with UI objects 232 on the ECH system 212 and UI objects 233 on the CAD system 214. These UI objects may then be included on the UI card as shown by UI objects 232A and 233A respectively. It should be noted that the UI objects on UI card 171 may be different from those on UI card 170, because the UI object interaction may be different for different triggers.

In some cases, an agency policy may determine what happens when there are two or more in-progress incidents. In some cases, the agency may define a priority policy (e.g. violent crime is always higher priority than property crime). So, when a higher priority incident is received, the system may automatically minimize (e.g. move to bottom of screen, make smaller, etc.) the lower priority incident UI card, and give focus to the higher priority incident card. As shown in FIG. 2, the incident associated with UI card 170 is lower priority, and has thus been minimized, while the UI card 271 associated with the new incident has been given priority.

In some cases, the dispatcher may be allowed to determine which incident is worked on based on their own preference. The IRE 154 may monitor the user's preference for which incident type they wish to work on first (assuming no agency policy), and based on that determination may or may not cause a new incident to supersede a currently in progress incident.

It should also be noted that even though a UI card may be minimized, triggers for that card may still be received and processed. For example, assume that the incident associated with UI card 170 is currently at a lower priority and has thus been minimized. A trigger may occur related to that incident (e.g. shots fired, officer down, etc.) that escalates the priority of the incident associated with UI card 170. UI card 271 may then be minimized and replaced with UI card 170 having the focus.

Figure 3:
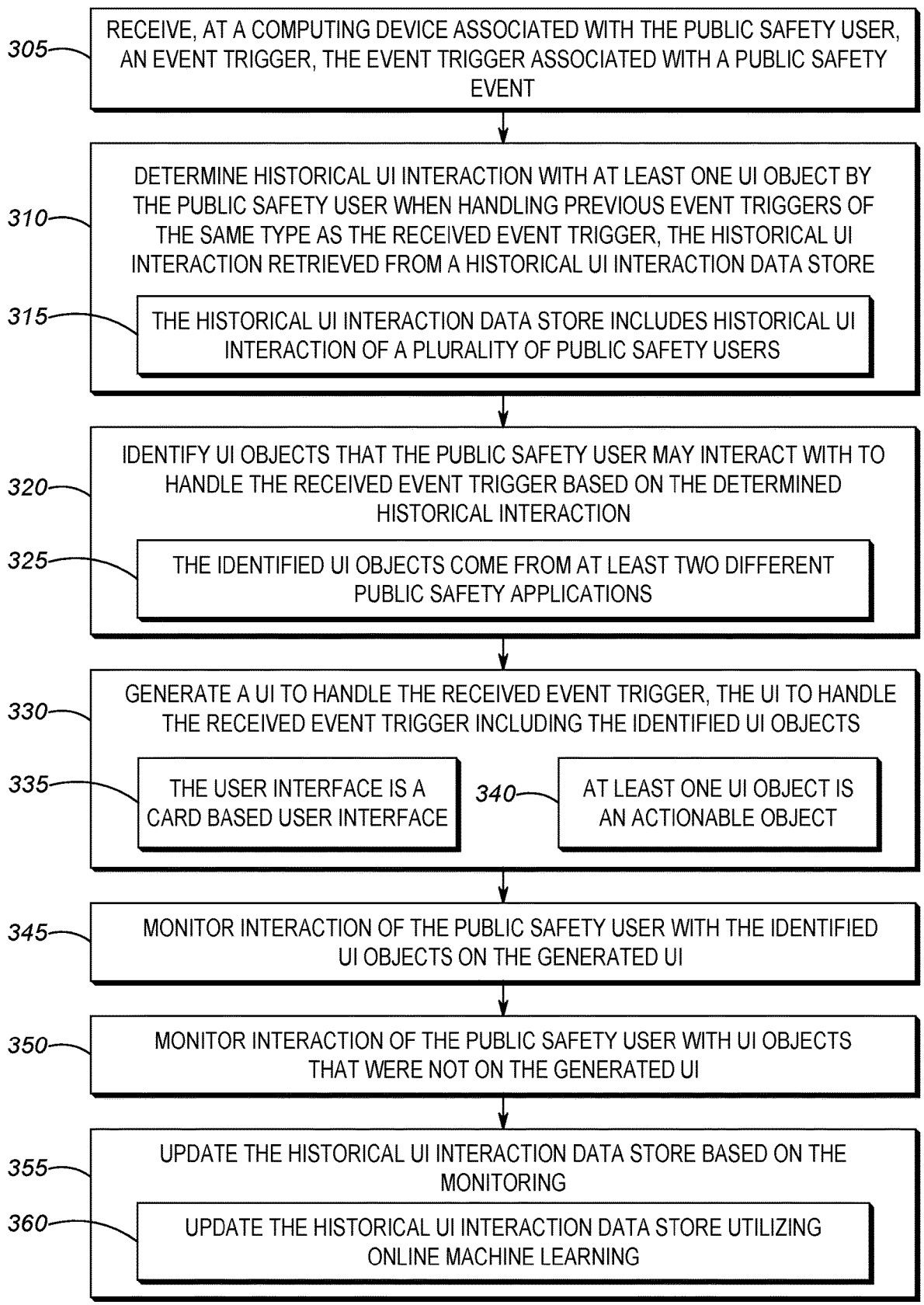
FIG. 3 is an example of a high level flow diagram for an implementation of the intelligently identifying and dynamically presenting incident and unit information to a public safety user based on historical user interface interactions techniques described herein.

FIG. 3 is an example of a high level flow diagram for an implementation of the intelligently identifying and dynamically presenting incident and unit information to a public safety user based on historical user interface interactions techniques described herein. In block 305 an event trigger may be received at a computing device associated with the public safety user. The event trigger may be associated with a public safety event. For example, the computing device may be the UID 150 described above. The event trigger may be a newly received incident, a change in context or status of an incident, or any of the other event triggers described above.

In block 310, historical UI interaction with at least one UI object by the public safety user when handling previous event triggers of the same type as the received event trigger may be determined. The historical UI interaction may be retrieved form a historical UI interaction data store. When an even trigger is received, the system may determine what UI objects the user previously interacted with when handling the same event trigger. This information may be used to generate a UI card for handling the event trigger as will be described in further detail below.

In some embodiments, as shown in block 315, the historical UI interaction data store includes historical UI interaction of a plurality of public safety users. As described above, in some implementations, the historical UI interactions of all user of the system are taken into account, not just an individual user. By utilizing the UI interactions of all users, the system may be better able to determine which UI objects will be interacted with by the majority of users. Thus, users that do not have sufficient historical UI interaction information of their own may utilize those UI interactions of others.

In block 320, UI objects that the public safety user may interact with to handle the received event trigger based on the determined historical interaction may be identified. In other words, based on the event trigger, it may be determined which UI objects the user has interacted with in the past. It is likely that the user will need to interact with these same UI objects when handling the current incident. As shown in block 325, in some cases the identified UI objects come from at least two different public safety applications. As explained above, in many cases the systems (e.g. ECH, CAD, R&E, etc.) are provided by different application vendors. As such, each vendor may have their own UI. The techniques described herein allow for the UI objects of different applications to be included in a single UI interface. In other words, the techniques described herein aggregate UI objects from separate publish safety applications into a single UI.

In block 330, a UI to handle the received event trigger may be generated. The UI to handle received event trigger may include the identified UI objects. As shown in block 335, the UI that is generated may be a card based user interface, wherein the user interface appears as a card and can be manipulated as a card (e.g. stacked, spread, etc.). Although a card based UI is described, it should be understood that the techniques described herein are not so limited. The techniques described herein may be utilized with any other form of UI. As shown in block 340, at least one UI object may be an actionable object. An actionable object is one that the user may actively interact with (e.g. clickable button, pull down menu, radio buttons, etc.). An actionable UI object is in contrast to passive UI objects which the user may simply view.

In block 345, interaction of the public safety user with the identified UI objects on the generated UI may be monitored. These objects may be monitored to determine if the user does actually interact with the UI objects. If the user does not interact with the identified UI objects, this may be an indication that the identification process described in block 320 may need to be updated.

In block 350, interaction of the public safety user with UI objects that were not on the generated UI may be monitored. These objects may be monitored to determine which actual UI objects the user interacts with when responding to an event trigger. If the user is interacting with UI objects that were not included on the generate UI, this may be an indication that the identification process described in block 320 may need to be updated.

In block 355 the historical UI interaction data store may be updated based on the monitoring. As explained above, the actual UI object interaction of the user is monitored to determine which objects the user actually interacted with, whether on the generated UI or directly accessed. The UI objects that were actually interacted with when responding to an even trigger are the ones that should likely be presented on the generated UI upon a subsequent receipt of the same even trigger. In block 360, the historical UI interaction data store may be updated utilizing online machine learning. In other words, the most recent UI object interactions are utilized to update the UI object interaction predictions.

FIG. 4 is an example of a device that may implement the techniques described herein. For example, a device that may implement the UID 150. It should be understood that FIG. 4 represents one example implementation of a computing device that utilizes the techniques described herein. Although only a single processor is shown, it would be readily understood that a person of skill in the art would recognize that distributed implementations are also possible. For example, the various pieces of functionality described above (e.g. UID, etc.) could be implemented on multiple devices that are communicatively coupled. FIG. 4 is not intended to imply that all the functionality described above must be implemented on a single device.

Device 400 may include processor 410, memory 420, non-transitory processor readable medium 430, event trigger interface 440, historical UI interaction database, dispatch position interface 460, and UI interaction interface 470.

Processor 410 may be coupled to memory 420. Memory 420 may store a set of instructions that when executed by processor 410 cause processor 410 to implement the techniques described herein. Processor 410 may cause memory 420 to load a set of processor executable instructions from non-transitory processor readable medium 430. Non-transitory processor readable medium 430 may contain a set of instructions thereon that when executed by processor 410 cause the processor to implement the various techniques described herein.

For example, medium 430 may include event trigger instructions 431. The event trigger instructions may cause the processor to receive event triggers. For example, the event triggers may be generated from the dispatch position 110 and sent to the processor via the event trigger interface 440. The event trigger instructions may be used to determine that an event trigger has occurred and that the UID 150 needs to process the event trigger. The functionality provided by the event trigger instructions is described throughout the specification, including places such as block 305.

The medium 430 may also include UI object identification instructions 432. The UI object identification instructions may cause the processor to access historical UI interactions database 450 to determine which UI object the user interacted with in the past when a given event trigger is received. Based on these previous interactions, the processor may identify which UI objects should be presented to the user. The functionality provided by the UI object identification instructions is described throughout the specification, including places such as blocks 310-325.

The medium 430 may also include UI generation instructions 433. The UI generation instructions 433 may cause the processor to generate a UI that includes the UI objects that were previously identified. The processor may create a UI, including a card based UI, that includes the identified UI objects. The generated UI may be presented to the user via the dispatch position interface 460. The dispatch position interface may be an interface that allows the processor to access one of the monitors at the dispatch position in order to display the UI card. The functionality provided by the UI generation instructions is described throughout the specification, including places such as blocks 330-340.

The medium may also include UI interaction monitoring instructions 434. The UI interaction monitoring instructions may cause the processor to monitor user interaction with all UI objects presented at the dispatch position (both on the UI card and from the individual systems themselves). For example, user interaction with UI objects may be received via the UI interaction interface, which may provide user interactions from the dispatch position. The UI interaction monitoring instructions may cause the processor to update the historical UI interactions in the historical UI actions database 450 based on which UI object the user did and did not interact with. The functionality provided by the UI interaction monitoring instructions is described throughout the specification, including places such as blocks 345-360.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. Reference to at least one of elements A and B means any number of element A alone, any number of element B alone, or any combination of any number of element A and element B. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a compact disc read only memory (CD-ROM), an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (IC) with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for generating a user interface (UI) for a public safety user comprising:
   receiving, at a computing device associated with the public safety user, an event trigger, the event trigger associated with a public safety event;
   determining historical UI interaction with at least one UI object by the public safety user when handling previous event triggers of the same type as the received event trigger, the historical UI interaction retrieved from a historical UI interaction data store;
   identifying UI objects that the public safety user may interact with to handle the received event trigger based on the determined historical interaction; and
   generating a UI to handle the received event trigger, the UI to handle the received event trigger including the identified UI objects.

2. The method of claim 1 further comprising:
   monitoring interaction of the public safety user with the identified UI objects on the generated UI;
   monitoring interaction of the public safety user with UI objects that were not on the generated UI; and
   updating the historical UI interaction data store based on the monitoring.

3. The method of claim 2 wherein updating the historical UI interaction data store further comprises:
   updating the historical UI interaction data store utilizing online machine learning.

4. The method of claim 1 wherein at least one UI object is an actionable object.

5. The method of claim 1 wherein the user interface is a card based user interface.

6. The method of claim 1 wherein the historical UI interaction data store includes historical UI interaction of a plurality of public safety users.

7. The method of claim 1 wherein the identified UI objects come from at least two different public safety applications.

8. A system for generating a user interface (UI) for a public safety user comprising:
   a processor; and
   a memory coupled to the processor, the memory containing a set of instructions thereon that when executed by the processor cause the processor to:
      receive, at a computing device associated with the public safety user, an event trigger, the event trigger associated with a public safety event;
      determine historical UI interaction with at least one UI object by the public safety user when handling previous event triggers of the same type as the received event trigger, the historical UI interaction retrieved from a historical UI interaction data store;
      identify UI objects that the public safety user may interact with to handle the received event trigger based on the determined historical interaction; and
      generate a UI to handle the received event trigger, the UI to handle the received event trigger including the identified UI objects.

9. The system of claim 8 further comprising instructions to:
   monitor interaction of the public safety user with the identified UI objects on the generated UI;
   monitor interaction of the public safety user with UI objects that were not on the generated UI; and
   update the historical UI interaction data store based on the monitoring.

10. The system of claim 9 wherein the instructions to update the historical UI interaction data store further comprises instructions to:
    update the historical UI interaction data store utilizing online machine learning.

11. The system of claim 8 wherein at least one UI object is an actionable object.

12. The system of claim 8 wherein the user interface is a card based user interface.

13. The system of claim 8 wherein the historical UI interaction data store includes historical UI interaction of a plurality of public safety users.

14. The system of claim 8 wherein the identified UI objects come from at least two different public safety applications.

15. A non-transitory processor readable medium containing a set of instructions thereon that when executed by a processor cause the processor to:
    receive, at a computing device associated with the public safety user, an event trigger, the event trigger associated with a public safety event;
    determine historical UI interaction with at least one UI object by the public safety user when handling previous event triggers of the same type as the received event trigger, the historical UI interaction retrieved from a historical UI interaction data store;
    identify UI objects that the public safety user may interact with to handle the received event trigger based on the determined historical interaction; and
    generate a UI to handle the received event trigger, the UI to handle the received event trigger including the identified UI objects.

16. The medium of claim 15 further comprising instructions to:
    monitor interaction of the public safety user with the identified UI objects on the generated UI;
    monitor interaction of the public safety user with UI objects that were not on the generated UI; and
    update the historical UI interaction data store based on the monitoring.

17. The medium of claim 16 wherein the instructions to update the historical UI interaction data store further comprises instructions to:
    update the historical UI interaction data store utilizing online machine learning.

18. The medium of claim 15 wherein at least one UI object is an actionable object.

19. The medium of claim 15 wherein the user interface is a card based user interface.

20. The medium of claim 15 wherein the identified UI objects come from at least two different public safety applications.

* * * * *